Aug. 24, 1937.   G. R. WEISZ   2,090,769
AUTOMATIC PACKING ADJUSTER
Filed Sept. 19, 1934

Inventor:
George R. Weisz,
by George Francis Myers,
his Attorney

Patented Aug. 24, 1937

2,090,769

UNITED STATES PATENT OFFICE 2,090,769

AUTOMATIC PACKING ADJUSTER

George R. Weisz, Brooklyn, N. Y.

Application September 19, 1934, Serial No. 744,613

1 Claim. (Cl. 286—26)

The invention relates to stuffing boxes for piston rods or plunger pistons used in connection with steam or other engines, and more particularly to an automatic packing adjuster therefor.

The invention has for its object the maintaining of a fluid tight joint between the piston and cylinder, and at the same time providing a complete, continued and uniform lubrication of the piston; or in other words providing means for preventing any leakage at the stuffing boxes of piston rods or plunger pistons, especially those using high pressure fluids, or engines used for compressing gases or the like.

Another object is to provide means for causing the packing to automatically adjust itself so that it will tightly embrace the part or parts adjacent thereto; being pressed against the piston not only by the pressure thereon due to the gland from the one side, but also pressed thereagainst by the fluid pressure from the opposite side.

Other objects and advantages of the present invention will be apparent from the following description, reference being had to the accompanying drawing wherein the preferred embodiment of the invention is clearly shown, and wherein similar numerals of reference denote similar parts throughout the several views.

Referring now to the said drawing.

Figure 1:
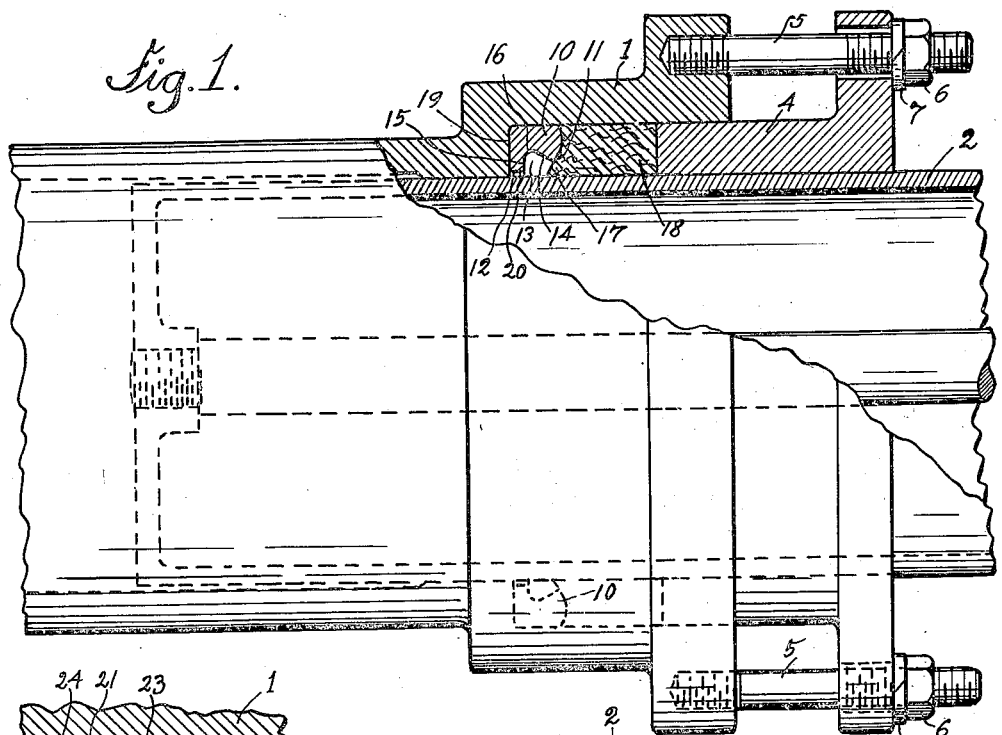
Figure 1 is a side elevation, partly cut away and showing a longitudinal cross section with the invention in place.

The invention is constructed and operated substantially and preferably as follows:

1 is the stuffing box wall, 2 the piston, 4 the gland sleeve, 5 the tightening bolts therefor, 6 the nut and 7 the washer thereof. The packing adjuster comprises a ring 10 having one side 11 beveled inwardly and having in its inner periphery 12 an annular recess 13 which has one of its walls 14 sloping outwardly and together with its opposite wall 15 and domed roof 16 is large enough to permit a portion 17 of the fibrous packing 18 to be forced into the recess.

The opposite side 19 of the ring of the adjuster is flat, and at its inner periphery 12 as at 20 it is cut away, so that the diameter of this inner periphery is slightly greater than the diameter of the piston rod or plunger piston.

Figure 2:
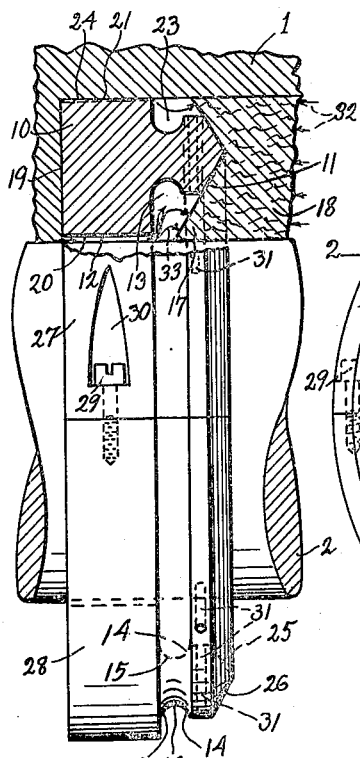
Fig. 2 is a side elevation of a modification of the invention shown in Fig. 1, with part of the same cut away (along the line 2—2 in Fig. 3), and shows a double acting packing adjuster.
Figure 3:
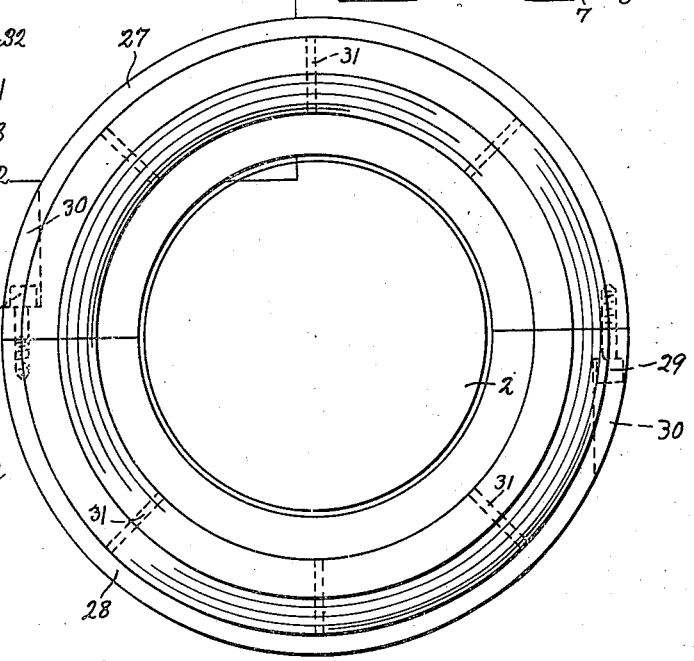
Fig. 3 is a front view of Fig. 2; the line 2—2 referring more particularly to the parts cut or broken away in Fig. 2.

The modification of the packing adjuster shown in Figs. 2 and 3 has the same general configuration as the one described above especially as far as its inner periphery is concerned; but in addition thereto, a second recess 23 on its upper periphery is noted, presenting two faces 25 and 26 which are wedge shaped to the fibrous packing 18.

This double action automatic packing adjuster is shown made in two parts 27 and 28 held rigidly together by the bolts 29 in niches 30. Pressure equalizing holes or apertures 31 allow the pressure to be the same in both recesses 13, 23.

As can be readily seen, not only is pressure as at 32 exerted on the fibrous packing 18 through the action or agency of the gland sleeve and its tightening bolts 5, pressing the fibrous packing against the piston rod or plunger piston, but being directly exposed to the pressure of the fluid in the pump or the like the fibrous packing is doubly pressed against the piston.

The pressure finds its way from the fluid pressure chamber through the cut away portion 20; a second cut away portion may be made as at 21 at the outer periphery 24 if desired. The arrows 33 indicate the direction of the fluid pressure coming through the cut away portion 20 and show this pressure striking the flexible portion 17; the main portion of the fibrous packing being held fixed. As aforesaid the fluid pressure may act through both recesses 13 and 23, the pressure being equalized in both recesses through the apertures or small holes 31.

In placing the fibrous packing in the stuffing box against the adjuster, pressure is applied to the gland sleeve 4 in order to shape the fibrous packing to the angle of taper, which may vary as desired, and then the pressure is slightly relieved to reduce friction. Friction is reduced to a minimum on the return stroke of piston rod or plunger piston on account of there being no pressure exerted on the packing during this operation. There is no wear on the adjuster as it does not come in contact with any moving parts.

As my invention is in some of its parts generic, I do not limit myself to the particular construction shown and described, but also contemplate the employment of such equivalents as fairly fall within the scope of the claim.

In this connection I may state that the shape of the recess shown in Fig. 1 can be used in the aduster shown in Figs. 2 and 3; the pressure equalizing holes 31 may be made or drilled in the neck of the annular wedge shaped portion instead of in the outer periphery thereof; and all kinds of soft packing can be used with the device.

Therefore it should be understood that I may make various changes in the form, proportion, size and detail of the structure shown and described, as well as the number and position of certain elements used, without departing from the spirit of the invention.

I claim:

The combination with a packing, and means for compressing the same, of an annular ring with an annular reentrant recess forming an adjuster, said ring having an overhanging pointed wedge shaped member spaced from the edge of the packing, and so constructed and arranged that when the packing is compressed in wedge shaped form part thereof will project partially beyond said member into the opening of said recess and present a packing flange so that when pressure enters said recess it will act on said flange for forcing the same away from said ring radially inward.

GEORGE R. WEISZ.